United States Patent [19]
Hood

[11] 3,778,773
[45] Dec. 11, 1973

[54] MATRIX OF SHIFT REGISTERS FOR MANIPULATING DATA

[75] Inventor: David Frederick Hood, Kanata, Ontario, Canada

[73] Assignee: Bell Canada-Northern Electric Research Ltd., Ottawa, Ontario, Canada

[22] Filed: Oct. 20, 1972

[21] Appl. No.: 299,245

[52] U.S. Cl. .......................... 340/166 R, 340/147 R
[51] Int. Cl. ............................................ H04g 3/00
[58] Field of Search .............................. 340/166 R

[56] References Cited
UNITED STATES PATENTS
3,480,959  11/1969  Richmond ...................... 340/166 X

*Primary Examiner*—Harold I. Pitts
*Attorney*—John E. Mowle

[57] ABSTRACT

A matrix of shift registers under the control of a plurality of gates for manipulating data information. The various functions which may be performed by the manipulator include serial-to-parallel and parallel-to-serial conversion, serial-to-serial buffering and interleaving or separating streams of data information.

6 Claims, 6 Drawing Figures

MATRIX OF SHIFT REGISTERS FOR MANIPULATING DATA

FIELD OF THE INVENTION

This invention relates to a matrix data manipulator and more particularly to one which is capable of providing serial-to-parallel or parallel-to-serial conversion of binary information. As well, it may provide data stream buffering which enables a plurality of information streams to be interleaved or separated, and also various other functions in a single versatile unit.

DESCRIPTION OF THE PRIOR ART

In the handling of digital information, it is often necessary to convert the information streams from one form to another. This has resulted in the development of various forms of digital converters. For instance, a plurality of serial data streams can be fed concurrently into corresponding shift registers and thence fed out in parallel into a multiplex unit which sequentially selects each of the parallel outputs in turn to provide a train of parallel digital outputs.

Conversely, the parallel information may be converted back to a plurality of serial information streams by selectively transferring the information into a number of shift registers under the control of a decoder. The information is then fed out from each of the shift registers in serial form.

Serial-to-serial converters have also been developed to enable the interleaving of information from a number of slow speed data streams into a single high speed data stream or vice versa. Serial-to-serial buffers also allow retiming of words without changing the data speed.

Each of the above-described units utilizes a substantially different circuit configuration. However, with the advent of integrated circuit techniques, it is desirable to have a single versatile unit which can perform all of these various forms of data manipulation. Ideally each of the basic units should be flexible enough that it can be placed in tandem with others to provide larger capacity units when required.

SUMMARY OF THE INVENTION

It has been discovered that the various functions of serial-to-parallel and parallel-to-serial conversion, serial-to-serial buffering, and interleaving or separating of data information, can be achieved in a single, versatile data manipulator by providing a matrix of shift registers under control of a plurality of gates.

Thus, in accordance with the present invention there is provided a matrix data manipulator comprising a plurality of modules forming a matrix having a number of rows and columns. Each of the modules has a pair of storage registers. One of each of the pairs of storage registers is serially interconnected with the others along the rows to form a first plurality of shift registers for transferring information therealong. Each of the modules also has a plurality of gates for controlling the intratransfer of information between the pair of storage registers in each of the modules, and also for controlling the intertransfer of information between the other of the pairs of storage registers of adjacent modules thereby forming a second plurality of shift registers.

In one particular embodiment, the second plurality of shift registers is formed along each of the columns. This provides the aforementioned serial-to-parallel or parallel-to-serial conversion. In addition, the data manipulator includes additional gates for controlling the intertransfer of information between the other of the pairs of storage registers of adjacent modules to form a third plurality of shift registers along each of the rows. This provides the serial-to-serial buffering thus enabling the interleaving or separating of data information.

The invention may also encompass still further gates for controlling the intertransfer of information between the other of the pairs of storage registers of adjacent modules in a direction opposed to that controlled by the additional gates to form a fourth plurality of shift registers along the rows. This permits word reversal; thus a serial data stream may be fed in with the least significant bit first, and be fed out serially with the most significant bit first.

BRIEF DESCRIPTION OF THE DRAWINGS

An example embodiment of the invention will now be described with reference to the accompanying drawings in which.

DESCRIPTION OF THE PREFERRED EMBODIMENT

In the following example embodiment, the digital information will be defined in terms of positive logic utilizing 1's and 0's. Consequently, all registers and gates will respond to positive going clock or gate signals. For simplicity, many of the clock pulses illustrated in FIGS. 2 through 6 are shown as a single vertical line designating the leading edge of the positive going signals. It will be understood that in reality, all such pulses have a finite width.

Figure 1:
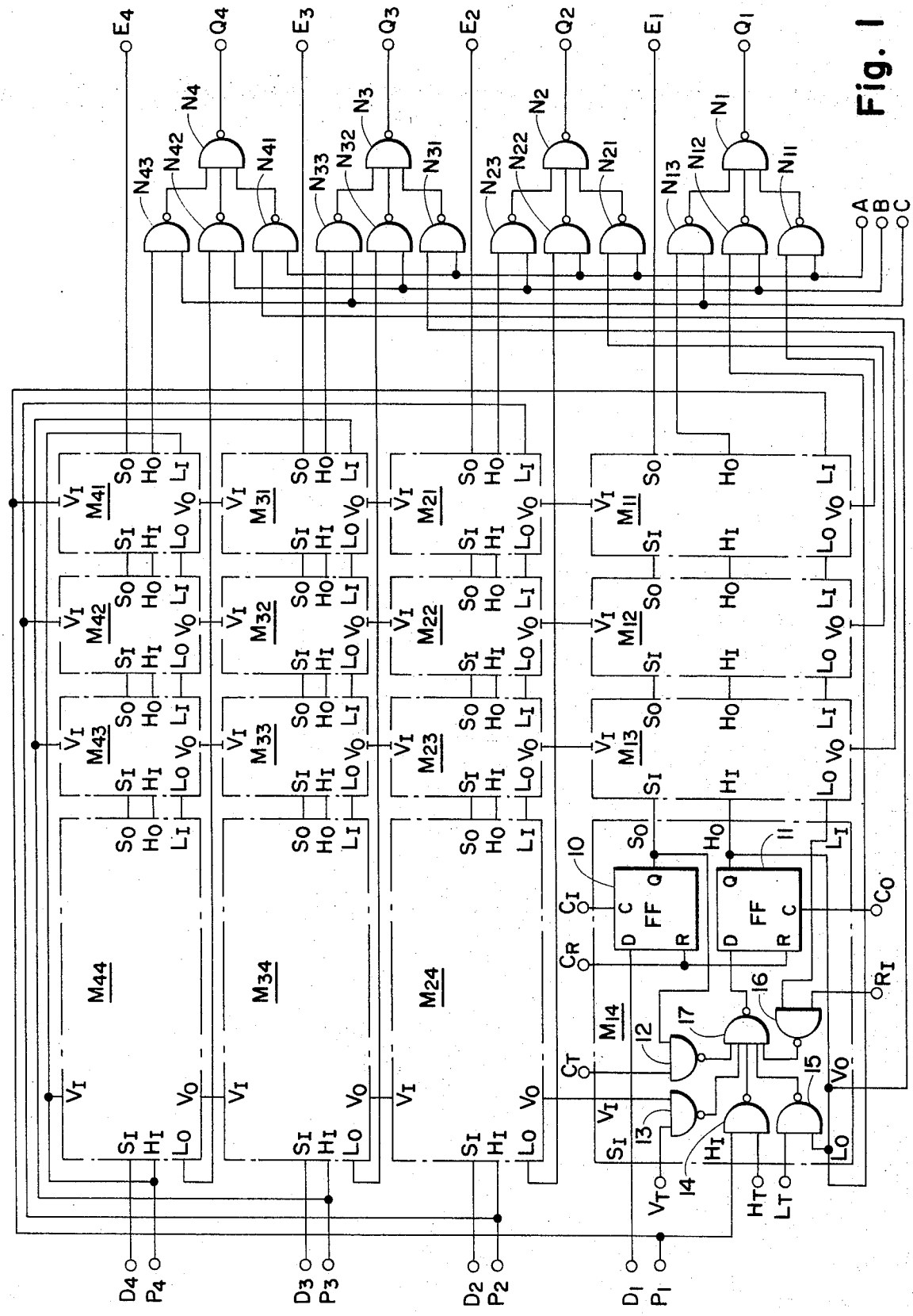
FIG. 1 is a block schematic diagram of a matrix data manipulator in accordance with the present invention.

Referring to FIG. 1, the matrix data manipulator comprises a 4×4 matrix of identical modules $M_{11}$, $M_{12}$, $M_{13}$ - - - $M_{43}$, $M_{44}$. Since each of the modules is identical, only the lower left-hand module $M_{14}$ has been illustrated in detail. A plurality of inputs, which are common to each of the modules, are utilized to apply control signals to the various logic elements within. For simplicity and clarity, a number of these common inputs are illustrated only in the module $M_{14}$. It will be understood that they are present in all of the modules even though not shown. Additionally, the control signals applied to these various inputs will bear the same designation as the input itself. Hence in portions of the specification and drawings the control signal itself will be referred to rather than the particular input.

Each of the modules $M_{11}$ – $M_{44}$ comprises a pair of type D flip flops (FF's) 10 and 11 which function as single-bit storage registers. The logic level at the D input, i.e., a 1 or 0, is stored in the FF's 10 and 11 during the positive going edge of a clock signal applied to the C input. The stored information signal is present at all times at the Q output of the FF's 10 and 11. Both FF's 10 and 11 may be cleared by applying a reset signal to the R input which is simultaneously applied to all modules through the $C_R$ input. The FF's 10 and 11 are controlled by clock input and output signals $C_I$ and $C_O$ respectively, which are applied to all inputs bearing these designations. Each of the modules also includes five two-input NAND gates 12, 13, 14, 15 and 16 and a single five-input NAND gate 17. While in many instances, it is desirable that each of the modules or for that matter the entire matrix of modules be constructed as an integral unit, it will be appreciated that this form of construction need not be adhered to. Thus the identification of individual modules in FIG. 1 of the drawings is for purposes of clarity only and the utilization of individual unit blocks may not exist in the practical realization of the manipulator.

While not necessary to the basic structure of the matrix data manipulator, the present embodiment also includes a plurality of NAND gates $N_1$, $N_2$, $N_3$ - - - $N_{42}$, $N_{43}$ which are utilized to control the output signals of the manipulator. The detailed structure of the matrix data manipulator will become readily apparent from the following circuit description of a number of its functions taken in conjunction with the FIGS. 2 through 6 illustrating various operating modes of the manipulator. As manifest in the following description, the interconnected FF's 10 form a plurality of shift registers along each of the rows; while the FF's 11 in conjunction with the coacting gates 13, 14, 16 and 17, form either a plurality of shift registers down the columns or a plurality of shift registers along the rows, the latter being capable of transmitting information in either direction.

SERIAL-TO-PARALLEL cONVERTER

Figure 2:
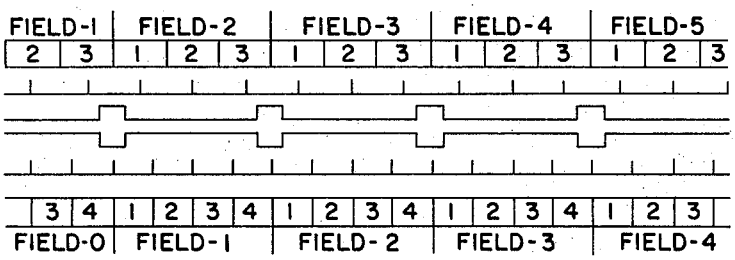
FIGS. 2 through 6 illustrate data information vs time for various operating configurations of the matrix data manipulator illustrated in FIG. 1.

FIG. 2 illustrates the timing sequence for a field of four 3-bit words. During operation in this mode, the A input = logic 1. All other control inputs are either as shown in FIG. 2 or are maintained at logic 0. Corresponding bits of each of the words are applied simultaneously to the inputs $D_1$, $D_2$, $D_3$ and $D_4$ shown in FIG. 1. The information bits are coupled through the serial inputs $S_I$ to the respective D inputs of the FF's 10.

Upon application of a clock pulse $C_I$, the logic information is stored in the FF's 10 of the left-hand column of the matrix. The application of subsequent clock pulses $C_I$ results in the information in each column being transferred one column to the right through serial outputs $S_O$ and inputs $S_I$. In this particular embodiment, three clock pulses $C_I$ are applied to transfer the information of a single field into the first three columns. Thus, the FF's 10 function as a plurality of shift registers along each of the rows of the manipulator. For example, for words W, X, Y and Z, each of 3 bits 1, 2 and 3, would be stored as follows:

COLUMNS

| Inputs | 4 | 3 | 2 | Rows |
|---|---|---|---|---|
| D4 | Z3 | Z2 | Z1 | 4 |
| D3 | Y3 | Y2 | Y1 | 3 |
| D2 | X3 | X2 | X1 | 2 |
| D1 | W3 | W2 | W1 | 1 |

After storage of a complete field, the information is transferred from the FF's 10 to the FF's 11 through the NAND gates 12 and 17 by application of both a control transfer signal $C_T$ (which is applied simultaneously to all the gates 12) and a clock pulse $C_O$.

As an example, if a 1 is present at the Q output of a FF 10, the presence of a 1 on the $C_T$ input causes the output of the NAND gate 12 to go to 0. Under quiescent conditions, the output from each of the NAND gates 12-16 is a 1 thereby making the output from the NAND gate 17 a 0. However, the presence of a 0 at the output of the NAND gate 12 forces the output of the NAND gate 17 to a 1 which is applied to the D input of the FF 11. The concurrent application of the clock pulse $C_O$ stores the applied information in the FF 11.

Conversely, if a 0 is present at the Q output of the FF 10 the output of gate 12 remains at the 1 level during the application of the control signal $C_T$. Since all inputs to the NAND gate 17 remain 1, the output of gate 17, which is stored in the FF 11, is a 0.

At this point in time, the first word is stored horizontally in the FF's 11 of the modules $M_{14}$, $M_{13}$ and $M_{12}$ in the bottom row, with the balance of the words being stored in ascending order along the balance of the rows of the matrix. A logic 1 is now applied to the vertical transfer input $V_T$. Consequently, with the application of each clock pulse $C_O$, the words are transferred in descending order of the FF's 11, down the columns through the vertical outputs $V_O$ and inputs $V_I$, and the NAND gates 13 and 17 of the matrix data manipulator. Upon reaching the bottom row, the digital information contained in each word is fed out from the vertical output $V_O$ and applied to the associated input of one of the NAND gates $N_{11}$, $N_{21}$, $N_{31}$ and $N_{41}$. Application of the logic 1 to the control input A results in the formation present at $V_O$ being applied through the respective NAND gates $N_{11}$, $N_{21}$, $N_{31}$ and $N_{41}$ and the NAND gates $N_1$, $N_2$, $N_3$ and $N_4$ to the outputs $Q_1$, $Q_2$, $Q_3$ and $Q_4$.

For example, under quiescent conditions, all inputs to the NAND gates $N_{11}$–$N_{43}$ are 0. Consequently the inputs to the NAND gates $N_1$–$N_4$ are all 1 with the result that the outputs $Q_1$, $Q_2$, $Q_3$ and $Q_4$ are 0. If now the vertical output $V_O$ of module $M_{14}$ goes to 1, both inputs to the NAND gate $N_{41}$ will be 1's forcing its output to a 0. The application of a 0 to the NAND gate $N_4$ results in a 1 at the output $Q_4$.

Conversely, if the output $V_O$ of the module $M_{14}$ remains at 0, the output from the NAND gate $N_{41}$ remains a 1 despite the presence of the 1 on input A. Consequently, the output $Q_4$ remains a 0.

This completes the serial-to-parallel conversion of a field of information. As is apparent from FIG. 2, because the FF's 10 and 11 are normally isolated from each other, except during the presence of the transfer signal $C_T$, the bits of one field can be serially fed in at $D_1$–$D_4$ while the words of the preceding field are being fed out in parallel at $Q_1$–$Q_4$. As is also evident, the input and output clocks $C_1$ and $C_O$ do not necessarily run at the same rate. The only restriction is that the output of one field from the manipulator must be completed prior to the transfer of information from the FF's 10 to the FF's 11 in each module; otherwise information will be lost.

PARALLEL-TO-SERIAL CONVERTER

Figure 3:
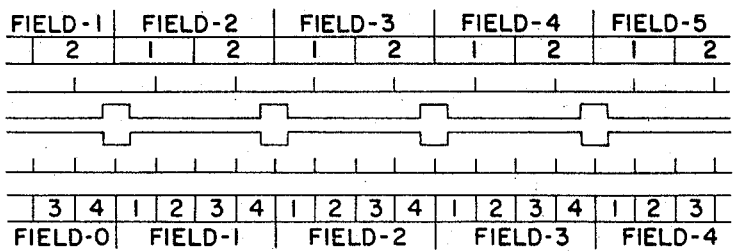

FIG. 3 illustrates the timing sequence for a field of two 4-bit words. During operation in this mode, the A input = logic 1. All other control inputs are either as shown in FIG. 2 or are maintained at logic 0. The information bits from each word are applied in parallel to the inputs $D_1$– $D_4$ and are then transferred along the rows by the application of clock pulses $C_I$. After the input of a complete field, the application of a control signal $C_T$ and a clock pulse $C_O$ transfers the information from the FF's 10 through the NAND gates 12 and 17 to the corresponding FF's 11 in each of the modules of the two left-hand columns. The two words, which are now stacked vertically in the columns, can now be serially fed out by application of a vertical transfer signal $V_T$ and a succession of clock pulses $C_O$. As in the previous example, application of a control signal A results in the information being serially fed out from the outputs $Q_3$ and $Q_4$.

It is evident from the preceding examples that any combination of bits and words may be converted from serial-to-parallel or parallel-to-serial up to a maximum of the 4×4 matrix. If a still larger conversion is required, a plurality of matrix data manipulators may be connected in tandem either horizontally or vertically by connecting the respective E outputs to the D inputs of a following horizontal unit and the Q outputs to the P inputs of a following vertical unit.

SERIAL-TO-SERIAL ACCELERATOR

Figure 4:
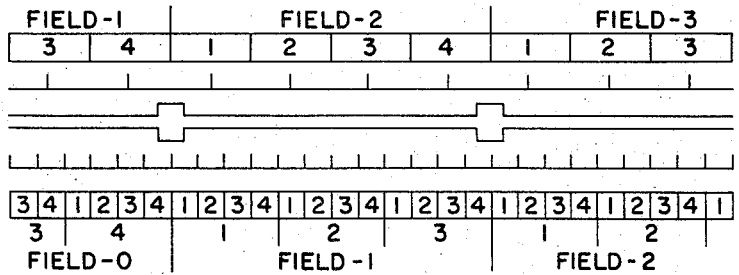

FIG. 4 illustrates the timing sequence for a field of three 4-bit words. During operation in this mode, the C input = logic 1. All other control inputs are either as shown in FIG. 4 or are maintained at logic 0. In addition, the outputs $Q_2$ and $Q_3$ are connected to the inputs $P_1$ and $P_2$ respectively. Corresponding bits of each of the words are applied in parallel to the inputs $D_1$–$D_3$ and are then transferred along the rows by the application of clock pulses $C_I$. After a complete field has been fed in, the application of a control signal $C_T$ and a clock pulse $C_O$ transfers the information from the FF's 10 through the NAND gates 12 and 17 to the corresponding FF's 11 in each of the modules of the three bottom rows of the matrix. The three words which are now stored horizontally, one in each of the rows, can now be fed out by application of a horizontal transfer signal $H_T$ and a succession of clock pulses $C_O$ which transfer the information along the rows of FF's 11 via horizontal outputs $H_O$ and inputs $H_I$, and the NAND gates 14 and 17. Information at the $H_O$ output of the modules $M_{11}$, $M_{21}$ and $M_{31}$ is directed through the appropriate NAND gates by the application of a logic 1 on the control input C to the respective outputs $Q_1$, $Q_2$ and $Q_3$. However, since the outputs of $Q_2$ and $Q_3$ are coupled to the inputs $P_1$ and $P_2$ respectively, the information is forced back through the shift register of the next lower row until all of the information finally emanates sequentially from the output $Q_1$. Consequently, in this operating mode, a plurality of slow speed input words can be interleaved and fed out in a single high speed data stream.

In an alternate embodiment of this operating mode, a single slow speed data stream may be fed in, transferred and then fed out in bursts of high speed data. Where the length of each word contains more than 4 bits, the E outputs of one row may be connected to the D input of the following rows, on the same matrix or other contiguous matrices, to extend the length of each of the shift registers.

SERIAL-TO-PARALLEL REDUCER

Figure 5:
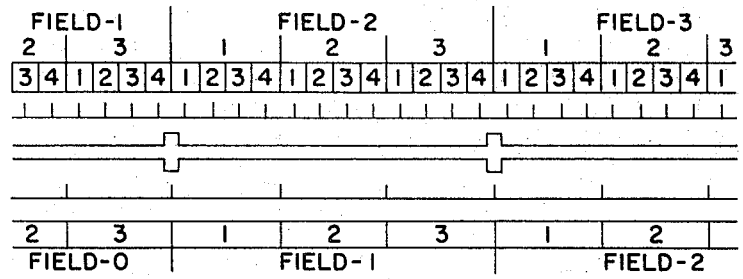

FIG. 5 illustrates the timing sequence for a field of three 4-bit words. During operation in this mode, the A input = logic 1. All other control inputs are either as shown in FIG. 5 or are maintained at logic 0. In addition, the outputs $E_2$ and $E_3$ are connected to the inputs $D_1$ and $D_2$ respectively. A single high speed data stream is applied to input $D_3$ and is then transferred along the rows by application of clock pulses $C_I$ until a complete field of 12 bits has been fed in. At this point, the bottom three rows of the matrix are filled. After the input of a complete field, the application of a control signal $C_T$ and a clock pulse $C_O$ transfer the information from the FF's 10 to the corresponding FF's 11 in each of the modules of the bottom three rows. The three words, which are now stored horizontally along the rows, can now be fed out in parallel by application of a vertical transfer signal $V_T$ and a succession of clock pulses $C_O$. Application of a control signal to the A lead results in the words being fed out in parallel from the outputs $Q_1$–$Q_4$. It will be apparent that the duration of the input and output words need not necessarily be the same. It is only essential that a complete field be emptied from the manipulator prior to the transfer of the following field from the FF's 10 to the FF's 11.

SERIAL-TO-SERIAL REVERTER

Figure 6:
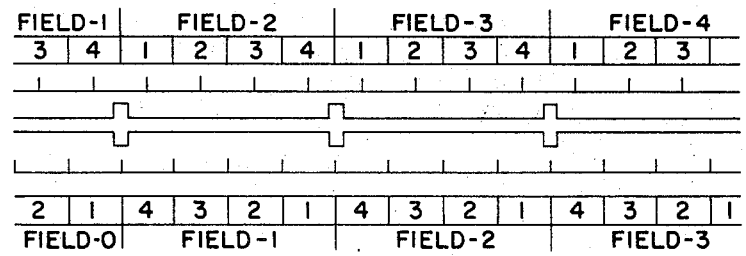

FIG. 6 illustrates the timing sequence for a field of four 4-bit words. During operation in this mode, the B input = logic 1. All other control inputs are either as shown in FIG. 6 or are maintained at logic 0. The information for each word is applied serially to the inputs $D_1$–$D_4$ and is then transferred along the rows by the application of clock pulses $C_I$. After the input of a complete field, the application of a control signal $C_T$ and a clock pulse $C_O$ transfers the information from the FF's 10 to the corresponding FF's 11 in each of the modules of the matrix. The four words, which are now stacked horizontally along the rows, can now be fed out by application of the reverse input signal $R_I$ to the NAND gate 16, and a succession of clock pulses $C_O$. The information in the FF's 11 is then transferred from right to left along the rows through left outputs $L_O$ and inputs $L_I$ to the outputs $L_O$. Application of the control signal B results in the information being serially fed out in reverse order from the outputs $Q_1$–$Q_4$. This operating mode enables incoming data to be presented serially, least significant bit first; and be fed out serially, most significant bit first or vice versa.

INFORMATION CIRCULATOR

In some instances, it may be desirable to circulate the information within each of the modules by the application of a clock pulse to provide a form of clock disabling function. This can be achieved by applying a local transfer signal $L_T$ to the NAND gate 15 whereupon the information at the Q output of the FF's 11 is coupled around the outputs $H_O$, $L_O$ and the NAND gates 15 and 17 back to its own D input. The application of a clock pulse $C_O$ will now return the information from the individual FF's 11 to itself.

By connecting various outputs back to inputs and clocking appropriately, it is obvious that the matrix data manipulator can be made to operate in various other modes not covered in the above examples. For instance, the length of the shift registers may be varied. Additionally, various information bit delays can be achieved by feeding information in and out at different points of the matrix. It is also evident that some of the gates could be dispensed with in applications where some of the functions are not desired.

Also, the matrix itself need not necessarily be of rectangular form. It could, for instance, be a parallelogram of modules in which the input to each row is displaced one or more columns to the left or right from the row immediately preceding it.

In the above-described example embodiment, the FF's 10 are connected directly together to form the rows of input shift registers, while the FF's 11 are interconnected via various gates 12–17 to form the rows or columns of output shift registers. In an alternate embodiment this arrangement could be reversed so that the input FF's are interconnected via the various gates while the output FF's are connected directly together. Indeed, both sets of FF's could be interconnected via various gates although no practical advantage is foreseen with this arrangement.

What is claimed is:

1. A matrix data manipulator comprising:

a matrix of modules having a plurality of rows and columns;

each of said modules having a first and a second storage register, the first storage registers being serially interconnected along each of said rows to form a first plurality of shift registers for transferring information therealong;

first gating means for controlling the transfer of information from the first to the second storage register in each of said modules; and second gating means for controlling the transfer of information between adjacent second storage registers along each of said columns, said second gating means co-acting with said second storage registers to form a second plurality of shift registers along said columns.

2. A matrix data manipulator as defined in claim 1 which additionally comprises:

third gating means for controlling the transfer of information between adjacent second storage registers along each of said rows, said third gating meanS co-acting with said second storage registers to form a third plurality of shift registers along said rows.

3. A matrix data manipulator as defined in claim 2 which additionally comprises:

fourth gating means for controlling the transfer of information between adjacent second storage registers along each of said rows in a direction opposed to that controlled by said third gating means, said fourth gating means co-acting with said second storage registers to form a fourth plurality of shift registers along said rows.

4. A matrix data manipulator comprising:

a plurality of modules forming a matrix having a plurality of rows and columns;

each of said modules having a pair of storage registers, one of each of the pairs of storage registers being serially interconnected along each of said rows to form a first plurality of shift registers for transferring information therealong;

each of said modules also having a plurality of gating means for controlling the intratransfer of information between the pair of storage registers in each of the modules, and the intertransfer of information between the other of the pair of storage registers of adjacent modules to form at least a second plurality of shift registers.

5. A matrix data manipulator comprising:

a matrix of modules having a plurality of rows and columns;

each of said modules having a first and a second storage register, the first storage registers being serially interconnected along each of said rows to form a first plurality of shift registers for transferring information therealong;

first gating means for controlling the transfer of information from the first to the second storage register in each of said modules; and second gating means for controlling the transfer of information between adjacent second storage registers along each of said rows, said second gating means co-acting with said second storage registers to form a second plurality of shift registers along said rows.

6. A matrix data manipulator comprising:

a matrix of modules having a plurality of rows and columns;

each of said modules having a pair of single-bit storage registers, one of each of the pairs of single-bit storage registers being serially interconnected along each of said rows to form a first plurality of shift registers for transferring data information therealong;

first gating means for controlling the transfer of said data information from said one single-bit storage register to the other single-bit storage register in each of said modules;

second gating means for controlling the transfer of said data information between said other single-bit storage registers of adjacent modules along each of said columns, said second gating means co-acting with said other single-bit storage registers to form a second plurality of shift registers along said columns;

third gating means for controlling the transfer of said data information between said other single-bit storage registers of adjacent modules along each of said rows, said third gating means co-acting with said other single-bit storage registers to form a third plurality of shift registers along said rows;

so as to provide either serial-to-parallel conversion, parallel-to-serial conversion or serial-to-serial buffering of the data information.

* * * * *